DISTRIBUTIVE MANIFOLD

Filed June 30, 1967

DISTRIBUTIVE MANIFOLD

INVENTORS
TROY D. FUCHSER
JAMES C. SADLER

Harold E. Meier

ATTORNEY

INVENTORS
TROY D. FUCHSER
JAMES C. SADLER
Harold E. Meier
ATTORNEY

April 8, 1969 T. D. FUCHSER ET AL 3,438,029

DISTRIBUTIVE MANIFOLD

Filed June 30, 1967 Sheet 5 of 6

INVENTORS
TROY D. FUCHSER
JAMES C. SADLER

Harold E. Meier

ATTORNEY

INVENTORS
TROY D. FUCHSER
JAMES C. SADLER
Harold E. Meier
ATTORNEY

United States Patent Office 3,438,029
Patented Apr. 8, 1969

3,438,029
DISTRIBUTIVE MANIFOLD
Troy D. Fuchser and James C. Sadler, Dallas, Tex., assignors to Texas Instruments Incorporated, Dallas, Tex., a corporation of Delaware
Filed June 30, 1967, Ser. No. 650,495
Int. Cl. G01s 9/56
U.S. Cl. 343—5 17 Claims

ABSTRACT OF THE DISCLOSURE

A distributive manifold for a modular microwave transmitter-receiver assembly made up of a large number of transmit-receive building block modules each having the facility to transmit a frequency signal during a first operation and receive a frequency signal during a second operation. Included in the distributive manifold is a submanifold for dividing a transmit frequency signal into four equal amplitude and in-phase signals transmitted to four RF building block modules during the transmit operation. One-quarter of the total number of said submanifolds is supplied the transmit frequency signal through a main manifold. Four main manifolds are included in a total system with each supplied an RF signal from a four-way divider. The signal received during the second operation by four building block modules is combined in one submanifold unit; one-quarter of the signals so combined is further combined in the main manifold wherein they are properly weighted depending upon their distribution over the total array. Thus, the total number of input signals received by the module elements is reduced to four substantially identical signals which are added and subtracted in pairs to generate a sum and difference intermediate frequency signal.

This invention relates to a distributive signal system, and more particularly to a submanifold for supplying to and receiving signals from a plurality of antenna modules, a plurality of the submanifolds coupled to a main manifold system.

While the specific embodiment of the invention described herein is an airborne terrain-following radar, this invention is equally applicable to other radar systems, such as those used for ground mapping, search and detection, fire control, tracking and navigation, as well as to microwave transmitting and receiving generally.

Radar systems in general, and airborne radar systems in particular, have long required considerable servicing and have been somewhat unreliable because of the many mechanical parts, such as rotary joints, motors, synchros, gears, and other servo components normally essential to a scanning system. The magnetrons used for transmitting, klystrons used for transmitting and local oscillator service in the high power transmit-receive protection devices have also been found somewhat unreliable. It is also difficult to achieve high power at high frequencies and the system components mentioned tend to be more unreliable and less practical as the frequency of the transmitted and received energy increases.

In U.S. Patent No. 3,386,092, dated May 28, 1968, U.S. Patent No. 3,345,631, dated Oct. 3, 1967, and U.S. Patent No. 3,417,393, dated Dec. 17, 1968, all of which were originally filed on Sept. 18, 1964, and assigned to the assignee of the present application, a radar system is described which utilizes a large array of solid-state modules. Each module is substantially a complete microwave transmitter and receiver. Each module includes the necessary circuitry for amplifying relatively low RF carrier energy applied simultaneously to all of the modules, and multiplying the frequency to a higher frequency for transmission from the antenna. Each module also includes circuitry for processing high frequency energy received from the antenna to produce a low frequency IF signal, which is also preamplified. In addition, each module includes phase shifting means for both the transmitted and received energy so that the beam from the fixed antenna array can be electronically scanned.

One of the problems encountered in putting together a large array of individual building block modules is that of splitting one, or more, low power RF signals into a large number of lower power RF signals to be transmitted from the individual building blocks. This problem is particularly acute in airborne radar systems wherein the total package must have a minimum size, weight, and complexity while still meeting good performance criteria. It is known that a high density configuration, having on the order of four module connectors per square inch is possible in a solid-state radar system. In addition to meeting the requirements of size, weight, and complexity, the distributive system must deliver signals to the individual modules that have the same relative phase. Also, the signals may have equal amplitude or may have amplitude weighting (for example, on the order of zero to twenty db). Finally, a preferred distribution system must have the facility of either dividing the transmitted signal or summing the received signal.

In a typical embodiment of the invention, 604 RF building blocks are arranged in a planar array having an octagonal shape. Each individual building block has two RF connectors located on the side opposite of the actual radiating antenna elements. The total array is divided into four quarter-sections with each section divided into thirty-nine subgroups. Thirty-four of the subgroups in each section are connected to four building block modules and the remaining five connected to only three building block modules. The five subgroups having only three modules include a dummy termination at two connectors. Each group of four RF building block modules is electrically tied together in a two-by-two unit square array by means of a submanifold stripline construction. These submanifolds are electrically connected together through a quarter-section primary feed circuit. The quarter sections are in turn connected together in a monopulse comparator and S-band four-way power divider section.

In accordance with this invention, there is provided a distributive manifold system wherein a plurality of substantially identical submanifolds are used to reduce the high density of the radio frequency building block connectors to a much lower density configuration of connectors which are easily handled in a less complex main manifold distributive circuit. The submanifolds being substantially identical in construction reduce considerably the energy expended in manufacturing, testing, and maintenance.

Further, in accordance with this invention, there is provided a distributive manifold system for a modular radar that permits the system array to expand, or contract, with a minimum or redesign to the manifold proper.

In addition, this invention provides a manifold system for a multiple RF building block array which can be installed, or removed, from the building blocks without critical alignment being disturbed in their support structure, and where necessary, only part of the manifold need be removed to gain access to specific areas of the total antenna.

A more complete understanding of the invention and its advantages will be apparent from the specification and claims and from the accompanying drawings illustrative of the invention.

Referring to the drawings.

Figure 1:
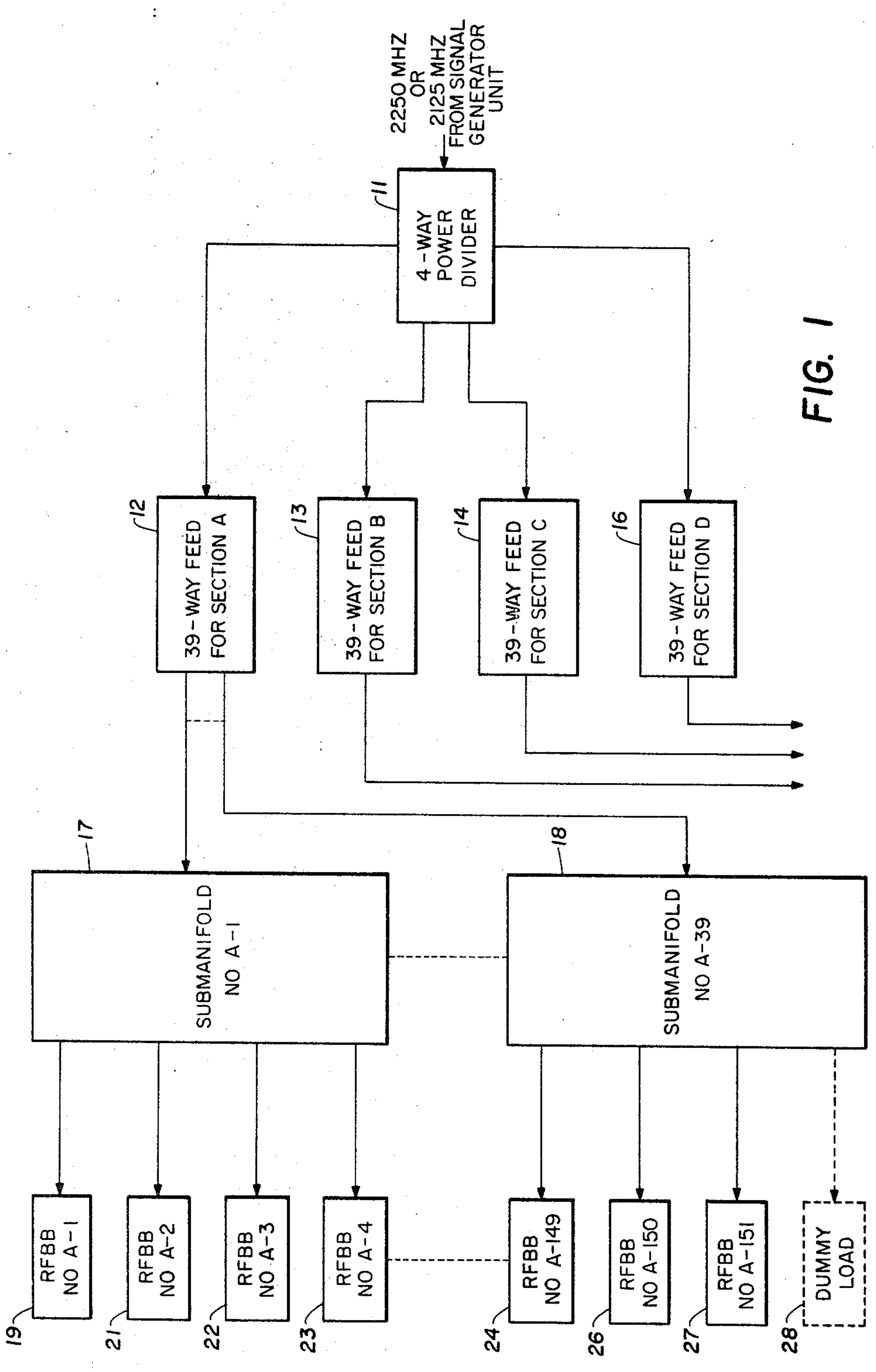
FIGURE 1 is a schematic of a submanifold and main manifold power divider system for distributing a low power RF signal to a plurality of radio frequency building block modules.

Referring to FIGURE 1, there is shown a part of a system for the transmit operation of a microwave antenna consisting of a plurality of individual modules. A high frequency transmit signal from a generating source (not shown) is connected to a four-way stripline power dividing network 11 which simply divides the signal from the generating unit into four equal amplitude, in-phase signals respectively coupled to four separate main manifolds 12, 13, 14, and 16. The main manifold networks are also of a stripline construction and function to further divide the input signal from the generating unit into thirty-nine equal amplitude and identical phase signals. Referring specifically to the main manifold 12, one of its thirty-nine output signals supplies a submanifold 17 and another supplies a submanifold 18. The thirty-seven other output signals from the main manifold 12 are similarly connected to submanifold units, not shown in FIGURE 1. Each of the main manifolds 13, 14, and 16 is similarly provided to feed thirty-nine individual submanifold units.

The submanifold unit 17 divides the signal from the main manifold 12 into four equal amplitude, in-phase signals respectively connected to the transmit connector (not shown) of building block modules 19, 21, 22, and 23. Similarly, the submanifold 18 divides its input signal four ways into four equal amplitude, in-phase signals respectively connected to the transmit connector (also not shown) of building block modules 24, 26, and 27. Depending on the particular configuration of the overall antenna array, some of the output signals from particular submanifold units, such as submanifold 18, will not be connected to an RF building block. In such cases, the unused output signal must be connected to a dummy load, such as load 28 connected to the submanifold 18.

Each of the building block modules, such as module 19, is essentially a separate microwave transmit-receiver which includes solid-state circuitry for amplifying a relatively low frequency RF carrier signal which can be more easily handled, and then multiplying the frequency of the RF signal several times before it is radiated from the antenna during a transmit cycle. During the receive cycle, the high frequency RF signal is mixed with a local oscillator signal to produce an IF signal which is amplified before leaving the building block module. In addition, each module contains phase shift circuitry for both the transmit and receive cycles in order to electronically scan the beam from the fixed antenna array. For a more complete description of a solid-state, electrically scanned airborne radar system, reference is made to the U.S. patents and patent applications previously listed. For applications other than airborne, such as microwave relay applications, the modules may only transmit, or only receive, or may not utilize the phase shift networks for beam steering.

Figure 2:
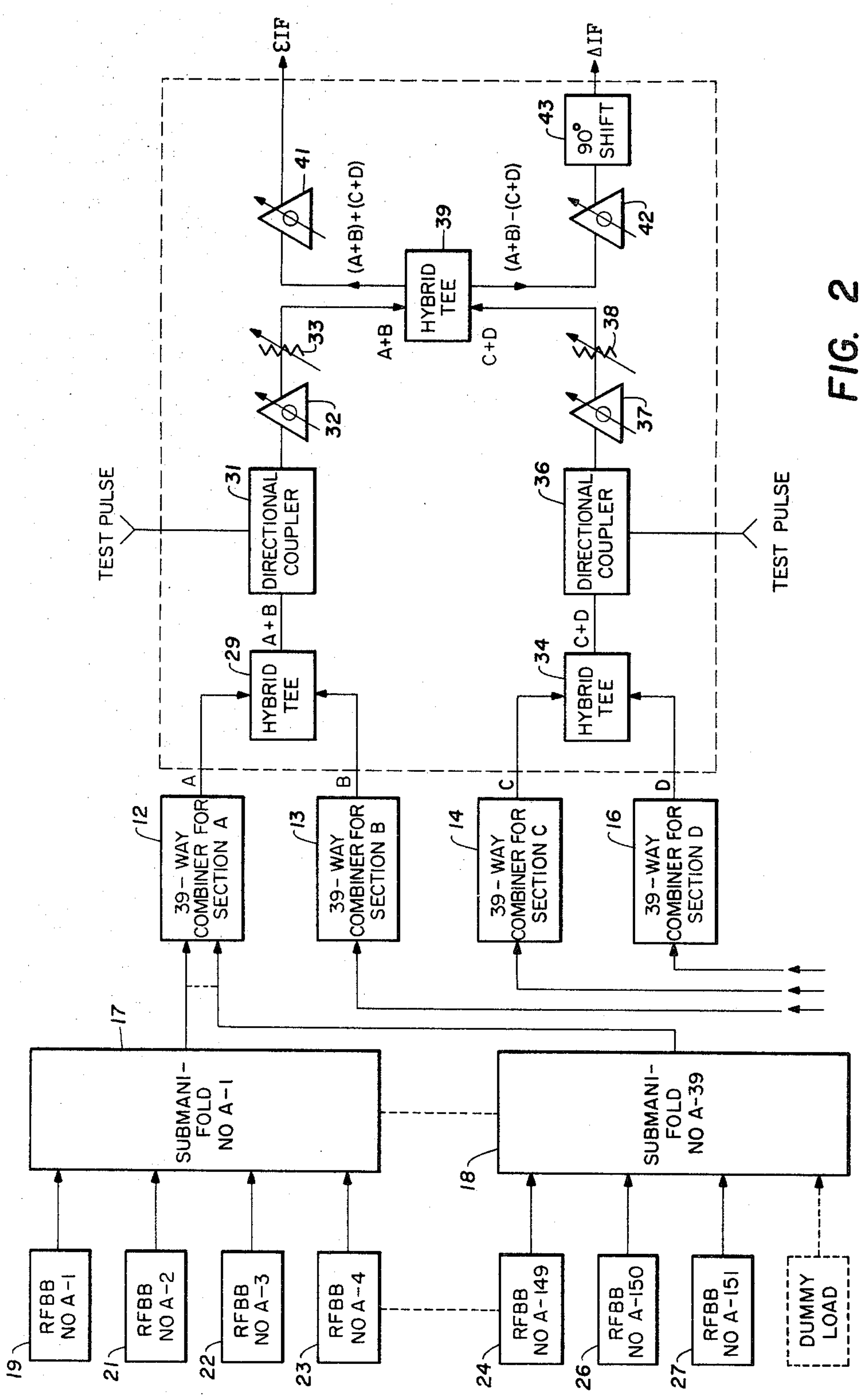
FIGURE 2 is a schematic of a submanifold and main manifold system for summation of a plurality of IF signals from a plurality of building block modules.

Referring to FIGURE 2, there is shown that part of a microwave radar system in operation during the receive cycle of the building block modules. The building block modules 19, 21, 22, and 23 each generates an IF frequency signal which is coupled to the summing network of the submanifold 17. Similarly, the building block modules 24, 26 and 27 generate IF signals coupled to the summing network of the submanifold 18. In a typical antenna array there are 604 building block modules each generating an IF signal of the same power level. For purpose of control, the 604 building blocks are divided into quadrants A, B, C, and D. One quadrant of the antenna array then includes 151 building block modules all of which, in groups of four, are connected to a submanifold, such as submanifold 17. Thus, all the building block modules in quadrant A between No. A–1 (module 19) to No. A–151 (module 27) are connected to submanifolds in groups of four. Quadrant A includes thirty-nine submanifolds, including submanifolds 17 and 18, which function to combine their four IF input signals into one signal which is coupled to the summing network of the main manifold 12. The building block modules of quadrants B, C, and D are similarly connected in groups of four to one of the thirty-nine submanifolds, all the submanifolds of one quadrant being coupled to the summing network of the main manifold for that quadrant. For quadrant B, the submanifolds are coupled to the summing network of the main manifold 13. For quadrants C and D the submanifolds are respectively connected to the summing network of the main manifolds 14 and 16. Since it is desirable to minimize the side lobes of the received energy wave, the main manifold units contain a weighted arrangement of stripline circuitry to add a particular weighting factor to each of its thirty-nine input signals. This will be explained more fully later in the description.

The combined weighted signals from the main manifolds 12 and 13 are coupled to a standard hybrid tee circuit 29 wherein they are combined and transmitted to a directional coupler 31. From the directional coupler 31 the signals from the main manifolds for quadrants A and B are transmitted through a phase adjusting circuit 32 and an amplitude adjustment circuit 33. Output signals from the main manifolds 14 and 16 are similarly coupled to a standard hybrid tee circuit 34 wherein they are combined and transmitted to a directional coupler 36. From the directional coupler 36 the IF signals from quadrants C and D are fed through a phase adjusting circuit 37 and an amplitude adjustment circuit 38. The properly phase adjusted and amplitude corrected signals from quadrants A and B and from quadrants C and D are combined in a hybrid tee circuit 39 wherein is generated a sum and difference IF signal for a receiver-processor circuit (not shown). The sum output of the hybrid tee circuit 39 is phase adjusted by means of a circuit 41, and the difference output of the circuit 39 is similarly phase adjusted in a circuit 42 and given a 90° phase shift in a phase shifting circuit 43.

Briefly then, the main manifolds each includes a transmit network which divides an input signal thirty-nine ways and a summing network which combines thirty-nine IF signals through a weighted arrangement of stripline circuitry. Submanifolds connected to the main manifolds also include a transmit network which divides an input signal four ways and a summing network which combines four IF signals into one signal.

Figure 3:
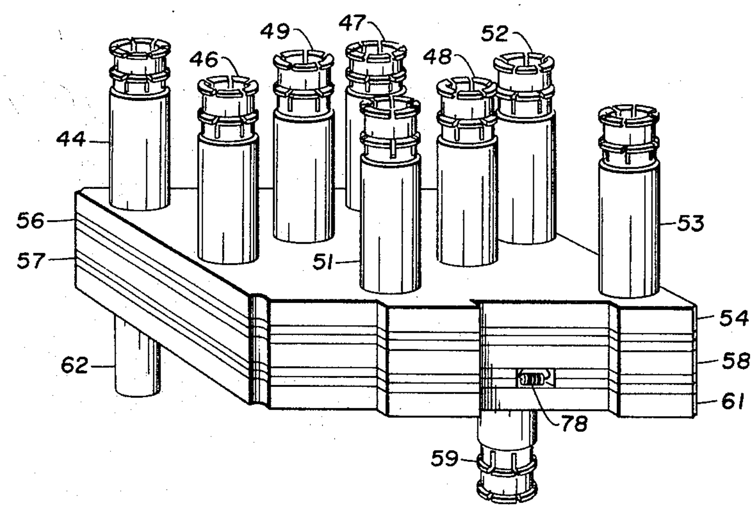
FIGURE 3 is an isometric view of a submanifold for dividing a single transmit RF frequency signal into four RF frequency signals and combining four IF signals into one IF signal.

Referring to FIGURE 3, there is shown a submanifold including couplers 44, 46, 47, and 48 each housing a coax connector for connecting an RF transmit signal to a building block module during the transmitting operation.

Also shown are couplers 49, 51, 52, and 53 each housing a coax connector for receiving an IF signal from a building block module during the receive operation. Thus, one building block module is connected to a submanifold by means of a coax connector in each of couplers 44 and 49, a second building block module is connected by means of a coax connector in each of couplers 46 and 51, a third building block module is connected by means of a coax connector in each of couplers 47 and 52, and a fourth building block module is connected to the submanifold by means of a coax connector in each of couplers 48 and 53. Each of the couplers 44, etc., is attached to a first compression plate 54.

The four RF signal coax connectors are attached to the RF stripline network on a circuit board 56. Similarly, the IF signal coax connectors are attached to the IF stripline network on a circuit board 57, spaced from the board 56 by means of a compression plate 58. An input signal is fed to the RF stripline network on the circuit board 56 by means of a coax connector mounted at right angles thereto and housed in a coupler 59 attached to a compression plate 58. The combined IF signal from the building block modules is transmitted from the submanifold through a coax connector attached to the stripline network of the board 57 and mounted in a coupler 62 attached to the compression plate 61. For a typical system 604 building block modules, there are 156 identical submanifolds of the type shown in FIGURE 3 and described above.

Figure 4:
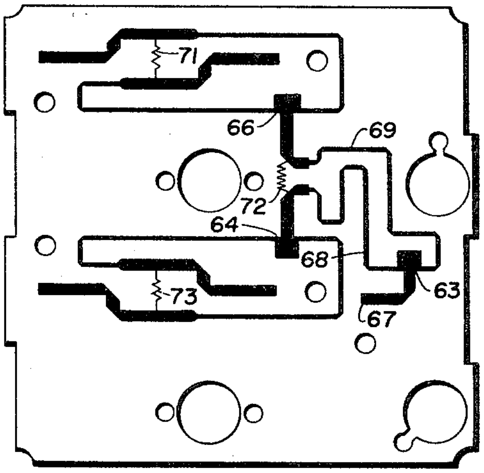
FIGURE 4 is a stripline divider network for the submanifold of FIGURE 3.

Referring to FIGURE 4, there is shown the stripline RF network of the circuit board 56 including split-tee dividers 63, 64, and 66. An RF signal connected to the 50 ohm transmission line 67 from a main manifold is divided into two equal amplitude inphase signals at the split-tee divider 63. One-quarter wavelength striplines 68 and 69 transmit the divided RF signal to the split-tee dividers 64 and 66, respectively. The split-tee dividers 64 and 66 again divide the RF signal into two equal amplitude inphase signals which are fed through quarter wavelength striplines to the coax connectors. For purposes of isolation between adjacent building block modules, small resistors 71, 72 and 73 are connected to the quarter wavelength striplines. These resistors are bridged across the output of each two-way power divider.

The split-tee power dividers 63, 64 and 66, when constructed in stripline configuration, are simple compact broad band devices capable of providing two isolated, inphase and equal amplitude outputs. A detailed explanation of the split-tee power divider is found in the technical article by L. I. Parad and R. L. Moynihan, entitled "Split-Tee Power Divider," in the January 1965 issue of IRE Transactions on Microwave Theory and Techniques. Briefly, a single split-tee power divider delivers two equal phase outputs having a specified power ratio between outputs. A good match between the input and output ports is possible with 20–30 db of isolation between output ports. At S-band frequencies, the insertion loss of a split-tee divider is about .1 to .2 db.

Figure 5:
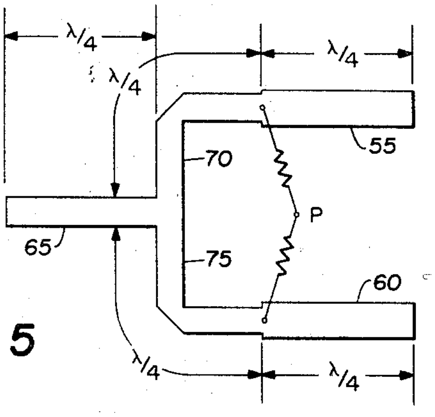
FIGURE 5 is a schematic of a split-tee divider circuit with resistor isolation.

Referring to FIGURE 5, there is shown a split-tee power divider consisting of a quarter wavelength line for each of two output sections 55 and 60, and a quarter wavelength line 65 in the input section joined by high impedance quarter wavelength sections 70 and 75. Although only two output lines are shown, it is possible to have an N-way power divider, the theory of operation of the N-way divider being the same as that of the split-tee divider.

A two resistor series network having a common floating point P is connected between the output sections 55 and 60. The split-tee configuration shown in FIGURE 5 is capable of splitting the input power unevenly between the output ports with zero theoretical insertion loss, the maximum attainable ratio of highest output power to the lowest output power being dependent on the number of outputs and on the maximum and minimum available line impedances. For conditions where the input power is to be split evenly among the output ports, the quarter wavelength lines 55 and 60 (and sometimes the quarter wavelength line 65) are deleted. The resistors may be any physical form compatible with the mechanical configuration of the stripline network. It has been found that miniature composition resistors can be used for frequencies as high as the S-band.

Figure 6:
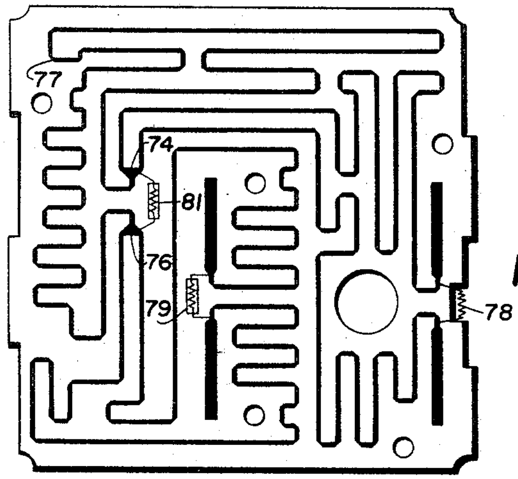
FIGURE 6 is a stripline summation network for the submanifold of FIGURE 3.

Since the split-tee divider is a reciprocal device, it is also capable of operating as a power summer. If each output part is energized with equal amplitude signals and the divider is designed for an unequal power split, the input signal will then be weighted accordingly and the unused power will be absorbed in the isolation resistors. If each output port is energized with the exact signal that would be produced if the device were operated as a divider, all the power from the two input signals (fed into sections 55 and 60) would be delivered to the output port (section 65). Referring to FIGURE 6, there is shown three split-tee power summers 74, 76 and 77 for combining the IF signals fed to the coax connectors of the couplers 49, 51, 52, and 53. These signals are combined into one IF signal at the summer junction 77. Isolation resistors 78, 79, and 81 are provided across the inputs of each power summer to provide electrical isolation should a malfunction occur in an adjacent building block module. One-quarter wavelength striplines connect the IF signals at the input ports to the split-tee summers 74 and 76. Similarly, one-quarter wavelength striplines connect the output of the summers 74 and 76 to the split-tee summer 77.

The stripline connectors on the RF circuit board 56 and IF circuit board 57 are formed by any of the many well-known printed circuit techniques. For example, a desired stripline pattern is drawn several times oversize and reduced by photographic process which results in a negative of the desired configuration having the proper dimensions. An electrically conductive surface, laminated to an insulation board, is exposed through the negative; all undesired areas are etched away leaving a conductive surface of the desired size and pattern. In a typical embodiment, the stripline boards are $\frac{1}{32}$ inch thick dielectric constant such as a glass cloth coated with polytetrafluoroethylene and the compression plates are $\frac{1}{10}$ inch thick aluminum plates.

Figure 7:
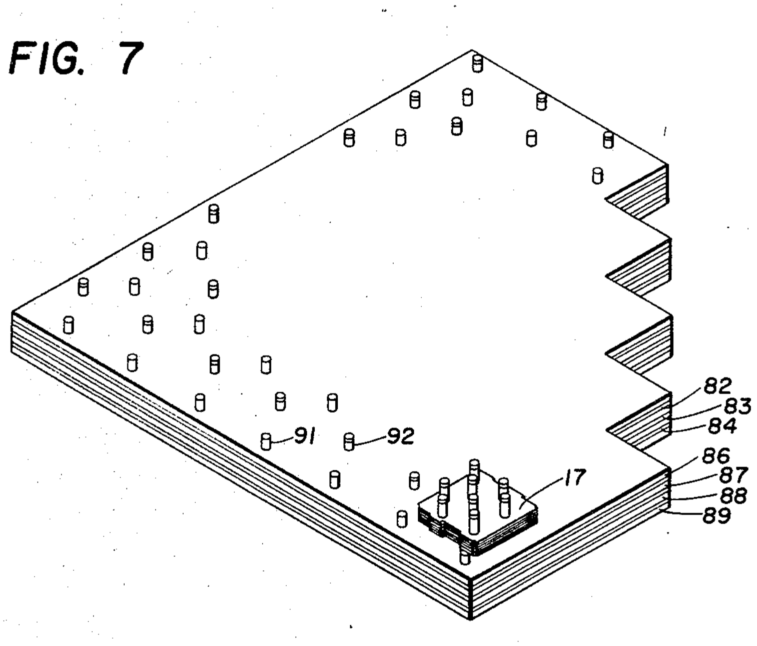
FIGURE 7 is an isometric view of a main manifold for thirty-nine submanifolds of the type shown in FIGURE 3.

Referring to FIGURE 7, there is shown a main manifold, such as manifold 12, consisting of three levels of stripline circuitry, two levels for the IF signals and one for the RF. A circuit board 82 contains the RF stripline circuitry and circuit boards 83 and 84 contain the IF stripline circuitry. The circuit board 82 is mounted between compression plates 86 and 87; the circuit board 83 is mounted between compression plates 87 and 88; and the circuit board 84 is mounted between compression plates 88 and 89. Mounted upon the compression plate 86 are thirty-nine couplers, such as coupler 91, each housing a coax connector attached at right angles to the output ports of striplines of the circuit board 82. Similarly, thirty-nine couplers, such as coupler 92, each housing a coax connector, are attached at right angles to the input ports of either the circuit board 83 or the circuit board 84. One RF coax connector and one IF coax connector mate with the corresponding connector on a submanifold, such as submanifold 17, as was described with reference to FIGURE 3. The thirty-nine RF signals transmitted from the coax connectors are the result of dividing an RF signal connected to the board 82 through an input coax connector (not shown). The thirty-nine IF signals connected to the main manifold are summed, after appropriate weighing of each signal, into a single IF output at an output coax connector (also not shown).

Figure 8:
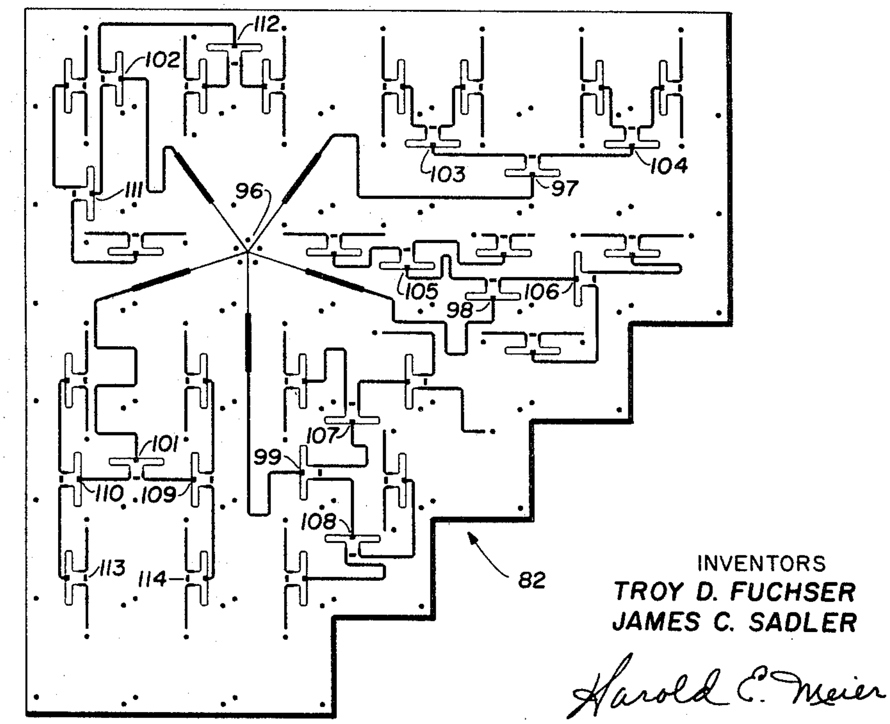
FIGURE 8 is a stripline divider network for the main manifold of FIGURE 7.

Referring to FIGURE 8, there is shown the stripline circuitry for the circuit board 82 including a five-way divider 96. The five output signals from the divider 96 are coupled to fifty ohm impedance transmission lines by means of quarter wavelength impedance matching networks. These five RF signals are split into ten signals by means of split-tee dividers 97, 98, 99, 101, and 102, the five split-tee dividers being substantially the same as those described previously with reference to FIGURE 4. The output sections themselves are, in turn, connected to other split-tee dividers. Thus, the ten RF signals are further split into twenty equal amplitude RF signals by means of split-tee dividers 103–112, inclusive. Further signal splitting is accomplished by means of split-tee dividers coupled to the twenty output ports of the dividers 103–112. The end result is that the input signal transmitted to the five-way divider 96 is subdivided into forty equal amplitude RF signals each coupled to the input coax connector of a submanifold. In a 604 module array, only thirty-nine submanifolds are connected to a section; thus, one of the forty outputs has a stripline termination (not shown). Isolation resistors similar to those described in connection with FIGURE 4 are required between the two output ports of each split-tee divider. To avoid undue complication of FIGURE 8, these resistors are shown as small rectangularly shaped blocks, such as blocks 113 and 114, for example. The stripline circuitry of the network shown in FIGURE 8 can be formed by any of the well-known techniques such as described previously. The input lines to the various split-tee dividers are fifty ohm impedance lines and the somewhat narrower striplines coupled to the tee itself are about 70.7 ohm impedance striplines.

Figure 9:
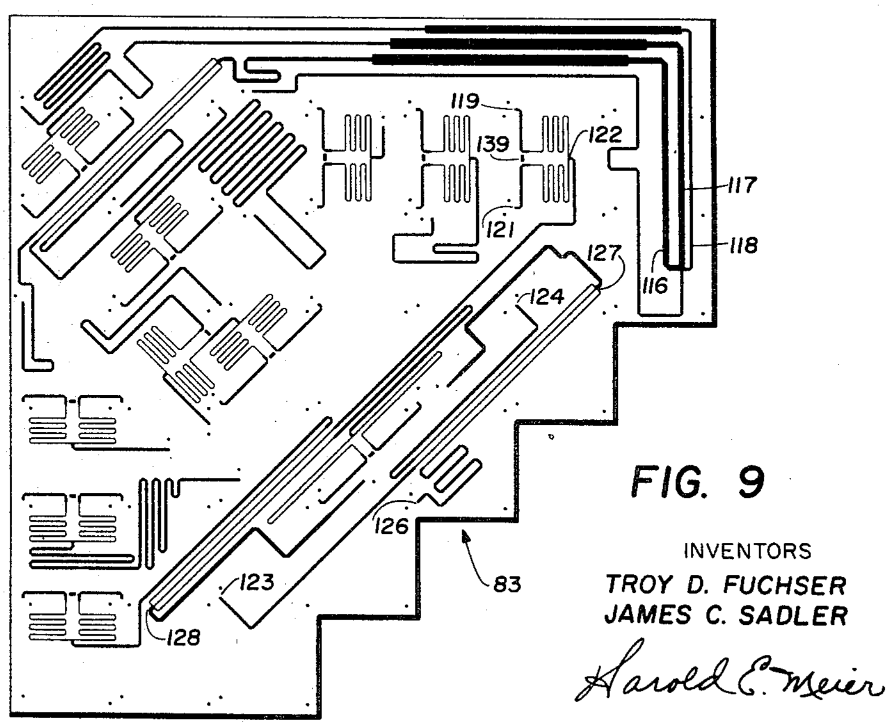

Referring to FIGURE 9, there is shown the circuit board 83 including an amplitude weighting circuit consisting of striplines 116, 117, and 118. Most of the thirty-nine IF signals from the submanifolds are coupled to either two or three-way summers on the circuit board 83. For example, two IF signals from different submanifolds are coupled to the striplines 119 and 121 of a two-way summer 122. Three IF signals from separate submanifolds are coupled to striplines 123, 124, and 126 of a three-way summer 127. The signal at the two-way summer 122 is further summed with two other such signals in a three-way summer 128. The signals from the three-way summers 127 and 128 are transmitted through the stripline network of the circuit board 83 to striplines 129 and 131, respectively, of the circuit board 84 shown in FIGURE 10. The sum of the weighted signals on the striplines 116, 117, and 118 is also transmitted through the circuit board 83 to a stripline 132 of the circuit board 84. The stripline 132 is tied to an amplitude weighting circuit including striplines 133 and 134. A third amplitude weighting circuit includes the striplines 136, 137, and 138 which function as a three-way summer connected to the stripline 134. All three amplitude weighting circuits are modifications of the split-tee divider discussed with reference to FIGURE 6. Amplitude weighting is effected by means of variable width transmission lines, wider striplines conducting more power to the summation junction than the narrower lines. Thus, referring to FIGURE 9, the stripline 116 conducts more power to the summing junction than the stripline 118. Again, isolation resistors are provided between each of the IF signals coupled to a split-tee summer such as summer 122. To avoid complicating the drawing, these resistors are shown as rectangular areas such as area 139.

Figure 10:
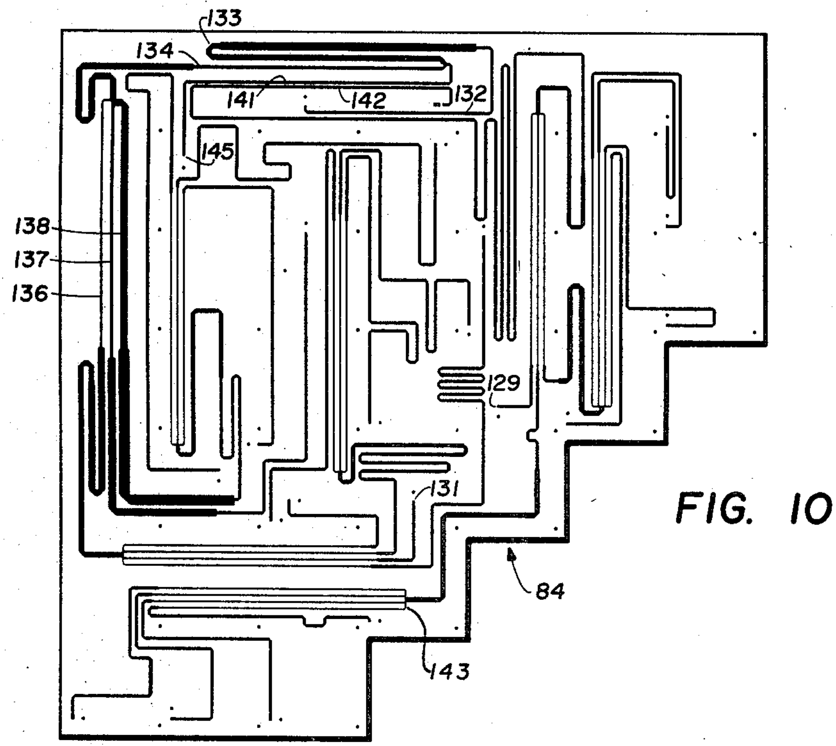
FIGURES 9 and 10 are stripline weighted signal summation networks for the main manifold of FIGURE 7.

The final summation of the IF input signals is performed by means of a power divider coupler including closely spaced stripline conductors 141 and 142, as shown in FIGURE 10. Because the ratio of the power signals is greater than 10 to 1, the final amplitude weighting network consists of a power divider coupler. Variable width stripline split-tee summers are limited to summing signals having relatively low power ratios. The total IF signal from the main manifold of FIGURE 7 is connected to a hybrid tee by means of a coax connector attached to the stripline 141 at point 145, as shown in FIGURE 10.

Figures 11, 12:
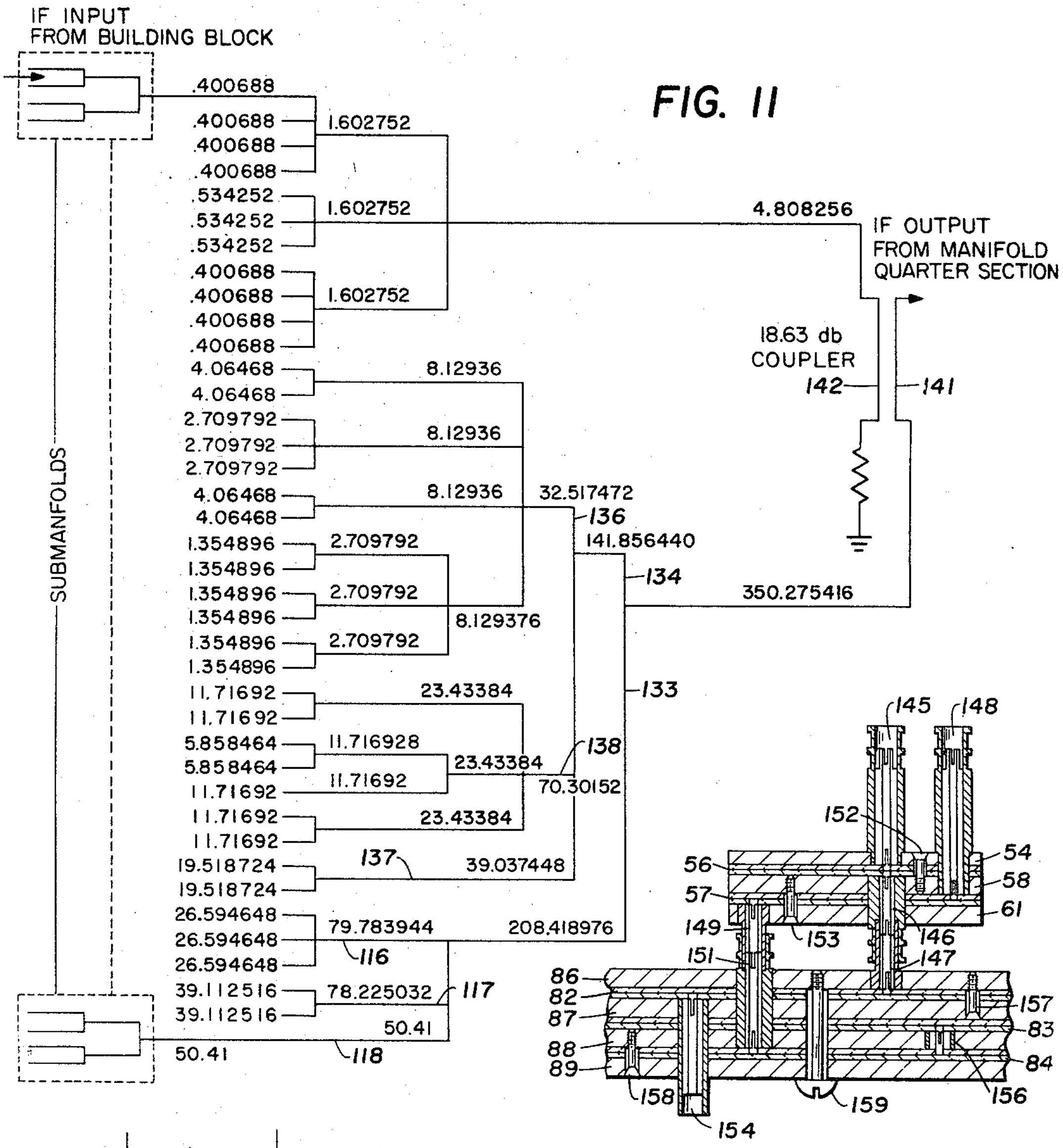
FIGURE 11 is a chart showing power ratios for a typical quarter section main manifold.
FIGURE 12 is a cross section showing the interconnection of a submanifold to a main manifold.

Referring to FIGURE 11, there is shown a line diagram of the thirty-nine input signals to the IF section of the manifold of FIGURE 7. The numbers appearing on each of the lines represent power ratios. Referring to the upper portion of the drawing, the first four signals are combined in a four-way summer on an equal weight, i.e., power ratio, basis. Similarly, the next three signals are combined in a three-way summer also on equal weight basis. The next four signals, like the first four, are combined in a four-way summer, such as summer 143 of FIGURE 10, on an equal weight basis. The three combined signals from the first eleven IF input signals are themselves combined on an equal weight basis in a three-way summer that is connected to the stripline 142 of the power divider coupler. IF signals from the next thirteen submanifolds are combined on an equal weight basis in two-, three-, and four-way summers; the sum total transmitted on the stripline 136. Of the next seven IF input signals from the submanifolds, one signal is summed as transmitted from a submanifold on an equal weight basis with the sum total of two other IF input signals and the other four are summed in groups of two on an equal weight basis, the combined signal being transmitted over the stripline 138. The signal on stripline 137 of the three line amplitude weighting circuit shown in FIGURE 10 is a combination of two relatively high weighted IF input signals. The signals on the striplines 136, 137, and 138 are combined in the amplitude weighting circuit terminating on the stripline 134. The stripline 134 is part of the two-way summer shown in FIGURE 10 which also includes the stripline 133. The IF signal on the stripline 133 is the result of amplitude tapering of signals on the striplines 116, 117, and 118. A signal on stripline 116 is the result of combining three IF signals on an equal weight basis from three submanifolds. A signal on stripline 117 is the result of combining two IF signals from submanifolds, also on an equal weight basis. The IF signal on stripline 118 is directly coupled from the submanifold to the amplitude tapering circuit. This signal is the only one so coupled. The signals on striplines 133 and 134 are summed in accordance with the ratios shown in FIGURE 11 and fed to the stripline 141 of the power divider coupler.

Referring to FIGURE 12, there is shown in section a submanifold coupled to a portion of a main manifold. A coax connector 145 is attached at right angles to a stripline of the circuit board 56 which is actually a sandwich of two insulating boards. Also attached to this stripline is a coax connector 146 in mating contact with a coax connector 147 of the main manifold. A coax connector 148 is fastened to a stripline of the circuit board 57 which is a sandwich of two insulating boards on either side of the conductive stripline. Also fastened to the stripline of the board 57 is a coax connector 149 in engagement with a coax connector 151 of the main manifold IF section. The compression plate 54 is bolted to the pressure plate 58 by means of a machine screw 152 and by a similar arrangement, a machine screw 153 bolts the compression plate 61 in position with respect to the plate 58.

The coax connector 147 is coupled to the stripline of the circuit board 82 which is a sandwich of two insulating boards on either side of the conductive stripline. The RF signal to the main manifold is transmitted by means of a coax connector 154 extending through the IF section and fastened to the stripline of the circuit board 82. For the IF section shown, the coax connector 151 is fastened to the stripline of the circuit board 84 passing through the circuit board 83. The circuit boards 83 and 84 are interconnected by means of a two-part connector 156. The plates 86 and 87 are bolted together by means of a machine screw 157 and the plates 88 and 89 are bolted together by means of a machine screw 158. The overall main manifold assembly is bolted together by means of a machine screw 159.

In a typical embodiment of the invention, the submanifolds are approximately 1.4 inches square by 0.4 inch thick and weigh approximately 0.12 lb. per unit. The total weight of four main manifolds and 156 submanifolds is on the order of about forty-three pounds for an antenna array of 604 building block modules. Power variation among the thirty-nine outputs of a main manifold is on the order of ±.5 db with an insertion loss of about 1.5 db; input VSWR is less than 1.3 to 1.0. A further reduction in size and weight is considered possible by using microstrip transmission line rather than the stripline as described; however, such an approach would undoubtedly require greater attention to shielding.

Another possible modification is to replace the composition isolator resistors in the split-tee power dividers with a deposited resistance material. The deposited resistance material would allow the stripline boards to lie substantially flat whereas the composition resistor requires some finite amount of space. Because of the versatility of the distribution system described, application to large or small arrays is a relatively simple manner as has already been indicated. For a planar array of several thousand modules, it is merely necessary to add more submanifolds. Although the overall width of the manifold would increase, the depth would remain the same, or increase by only one or two levels.

While only one embodiment of the invention, together with modifications thereof, has been described in detail herein and shown in the accompanying drawings, it will be evident that various further modifications are possible in the arrangement and construction of its components without departing from the scope of the invention.

We claim:

1. A distributive system for a plurality of modules alternately radiating and receiving microwave frequency signals comprising:

- a plurality of submanifolds each coupled to a part of said plurality of modules, each submanifold including a divider for distributing an isolated equal amplitude and equal phase signal to each module of said part, and
- a main manifold coupled to said plurality of submanifolds having a dividing network for distributing an isolated equal amplitude and equal phase signal connected to said main manifold to said plurality of submanifolds.

2. A distributive system as set forth in claim 1 wherein the divider of said submanifolds includes an arrangement of split-tee power dividers.

3. A distributive system as set forth in claim 2 wherein each of said submanifolds is coupled to four radiating modules and said divider of said submanifolds consists of three interconnected split-tee power dividers.

4. A distributive system as set forth in claim 3 wherein said main manifold includes an isolated N-way divider and a plurality of split-tee power dividers connected thereto.

5. A distributive system for a plurality of modules radiating and receiving microwave frequency signals comprising:

- a submanifold coupled to a part of said radiating modules having a power divider for distributing isolated signals of equal amplitude and equal phase to said radiating modules and a power summer for combining into one signal the isolated equal amplitude and equal phase signals received from each of said modules, and
- a main manifold for coupling to a plurality of said submanifolds having a divider network for distributing isolated equal amplitude and equal phase signals to said plurality of submanifolds and a summing network combining and weighting the isolated equal amplitude and equal phase signals received from said submanifolds.

6. A distributive system as set forth in claim 5 wherein the power dividers and power summers of said submanifold consists of a plurality of split-tee power dividers.

7. A distributive system as set forth in claim 6 wherein the main manifold summing network includes amplitude weighting summing junctions.

8. A distributive system as set forth in claim 5 wherein said submanifold is coupled to four of said plurality of modules and includes three interconnected split-tee power dividers and three interconnected split-tee power summers.

9. A distributive system as set forth in claim 8 wherein said main manifold includes a five-way divider and a plurality of split-tee power dividers coupled thereto.

10. A distributive system as set forth in claim 9 wherein the summing network of said main manifold includes three amplitude weighted N-way power summers and one power divider coupler.

11. A distributive system as set forth in claim 5 wherein said power dividers are optimized at one frequency and said power summers are optimized at another frequency.

12. A distributive system as set forth in claim 5 wherein said divider network and said summing network of said main manifold are optimized at different frequencies.

13. A submanifold for a plurality of modules radiating and receiving microwave signals of different frequencies comprising:

- a first circuit board having a power distributive network for distributing isolated signals of equal amplitude and equal phase to said radiating modules,
- a second circuit board having a power summing network for combining isolated signals of equal amplitude and equal phase received from said modules, and
- a plurality of connectors attached to said circuit boards to couple said power dividers and summers to the radiating modules and to a transmitting and receiving system.

14. A submanifold as set forth in claim 13 wherein said distributive network includes a plurality of split-tee power dividers and said summing network includes a plurality of split-tee power summers.

15. A submanifold as set forth in claim 14 wherein said power distributive and power summing networks each include three split-tee circuits.

16. A submanifold as set forth in claim 13 wherein said power distributive and summing networks comprise quarter wavelength striplines and isolation resistors.

17. A submanifold as set forth in claim 13 wherein said power distribution network is optimized at one frequency and said power summing network is optimized at another frequency.

References Cited

UNITED STATES PATENTS

| | | | |
|---|---|---|---|
| 3,013,227 | 12/1961 | Jordan | 333—84 |
| 3,255,450 | 6/1966 | Butler | 343—100.6 |
| 3,267,472 | 8/1966 | Fink | 343—100.6 |
| 3,276,018 | 9/1966 | Butler | 343—100.6 |

RODNEY D. BENNETT, Jr., *Primary Examiner.*

CHARLES L. WHITHAM, *Assistant Examiner.*

U.S. Cl. X.R.

333—6, 84; 343—100